(12) United States Patent
Wang et al.

(10) Patent No.: US 11,856,294 B2
(45) Date of Patent: Dec. 26, 2023

(54) ELECTRONIC DEVICE AND FOCUSING METHOD FOR ELECTRONIC DEVICE

(71) Applicant: VIVO MOBILE COMMUNICATION CO., LTD., Guangdong (CN)

(72) Inventors: Qiaoming Wang, Guangdong (CN); Jiatao Xie, Guangdong (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 17/746,424

(22) Filed: May 17, 2022

(65) Prior Publication Data
US 2022/0279129 A1      Sep. 1, 2022

Related U.S. Application Data

(63) Continuation of application No. PCT/CN2020/131165, filed on Nov. 24, 2020.

(30) Foreign Application Priority Data

Nov. 28, 2019   (CN) .......................... 201911194022.5

(51) Int. Cl.
*H04N 23/67*   (2023.01)
*H04N 23/45*   (2023.01)

(52) U.S. Cl.
CPC ........... *H04N 23/672* (2023.01); *H04N 23/45* (2023.01)

(58) Field of Classification Search
CPC ...... H04N 23/672; H04N 23/45; H04N 23/90; H04N 23/67; H04N 23/57
See application file for complete search history.

(56) References Cited

U.S. PATENT DOCUMENTS

| | | |
|---|---|---|
| 5,285,234 A | 2/1994 | Hasegawa et al. |
| 2011/0228145 A1 | 9/2011 | Kimura |
| 2011/0234767 A1 | 9/2011 | Tokiwa |
| 2012/0162631 A1* | 6/2012 | Hutchin ................. G01S 17/89 356/4.07 |
| 2014/0198245 A1 | 7/2014 | Kunugi et al. |

(Continued)

FOREIGN PATENT DOCUMENTS

| | | |
|---|---|---|
| CN | 103945110 A | 7/2014 |
| CN | 104272161 A | 1/2015 |

(Continued)

OTHER PUBLICATIONS

International Search Report and Written Opinion of the International Searching Authority regarding International Patent Application No. PCT/CN2020/131165, dated Feb. 9, 2021. Translation provided by Bohui Intellectual Property.

(Continued)

*Primary Examiner* — Gevell V Selby
(74) *Attorney, Agent, or Firm* — Harness, Dickey & Pierce, P.L.C.

(57) ABSTRACT

The embodiments of the present application disclose an electronic device and a focusing method, the electronic device comprises at least two cameras, wherein each of the at least two cameras is provided with a PD point pair set, an angle value between directions of straight lines in which the PD point pair sets on every two cameras in the at least two cameras are located is within a first preset angle range.

11 Claims, 3 Drawing Sheets

(56) References Cited

U.S. PATENT DOCUMENTS

| | | |
|---|---|---|
| 2015/0055011 A1 | 2/2015 | Aoki |
| 2015/0085178 A1 | 3/2015 | Aoki |
| 2016/0037103 A1 | 2/2016 | Seo et al. |
| 2016/0065833 A1 | 3/2016 | Chen et al. |
| 2016/0088245 A1 | 3/2016 | Nakata et al. |
| 2016/0150215 A1 | 5/2016 | Chen et al. |
| 2016/0323565 A1* | 11/2016 | van Baarsen ............ H04N 5/77 |
| 2017/0041525 A1 | 2/2017 | Liu et al. |
| 2017/0212327 A1 | 7/2017 | Lee et al. |
| 2017/0359536 A1* | 12/2017 | Lee ...................... H04N 25/617 |
| 2018/0150968 A1* | 5/2018 | Li ........................ H04N 23/672 |
| 2018/0152616 A1 | 5/2018 | Li et al. |
| 2019/0208132 A1 | 7/2019 | Saito et al. |
| 2020/0059604 A1 | 2/2020 | Zeng |

FOREIGN PATENT DOCUMENTS

| | | |
|---|---|---|
| CN | 105191285 A | 12/2015 |
| CN | 105338263 A | 2/2016 |
| CN | 105376474 A | 3/2016 |
| CN | 105611275 A | 5/2016 |
| CN | 106331484 A | 1/2017 |
| CN | 106331499 A | 1/2017 |
| CN | 106449674 A | 2/2017 |
| CN | 106506922 A | 3/2017 |
| CN | 106791373 A | 5/2017 |
| CN | 106973206 A | 7/2017 |
| CN | 107124547 A | 9/2017 |
| CN | 107395990 A | 11/2017 |
| CN | 109073858 A | 12/2018 |
| CN | 109639974 A | 4/2019 |
| CN | 109862271 A | 6/2019 |
| CN | 110769162 A | 2/2020 |
| EP | 2146500 A2 | 1/2010 |
| EP | 2762942 A1 | 8/2014 |
| EP | 3280133 A1 | 2/2018 |
| JP | 2018050267 A | 3/2018 |
| JP | 2019087880 A | 6/2019 |

OTHER PUBLICATIONS

First Office Action regarding Chinese Patent Application No. 201911194022.5, dated Sep. 17, 2020. Translation provided by Bohui Intellectual Property.

Second Office Action regarding Chinese Patent Application No. 201911194022.5, dated Feb. 4, 2021. Translation provided by Bohui Intellectual Property.

First Office Action regarding Indian Patent Application No. 202217035746, dated Nov. 14, 2022.

Supplementary European Search Report regarding European Application No. 20893880.3-1208, dated Nov. 25, 2022.

First Office Action regarding Japanese Patent Application No. 2022-527786, dated Apr. 21, 2023. Translation provided by Bohui Intellectual Property.

* cited by examiner

ELECTRONIC DEVICE AND FOCUSING METHOD FOR ELECTRONIC DEVICE

CROSS-REFERENCE TO RELATED APPLICATIONS

This application is a Bypass Continuation application of PCT/CN2020/131165 filed on Nov. 24, 2020, which claims priority to Chinese Patent Application No. 201911194022.5 filed on Nov. 28, 2019, which are incorporated herein by reference in their entirety.

TECHNICAL FIELD

Embodiments of the present application relate to the field of communications technologies, and in particular, to an electronic device and a focusing method.

BACKGROUND

Usually, when a user takes a picture by using an electronic device, the electronic device may use a phase difference auto focus (PDAF) method to focus, to obtain a relatively clear picture. For example, the electronic device may calculate a phase difference by using a PD point pair provided on a sensor, and convert the phase difference into a moving distance of a motor in a lens module, so that the electronic device may determine a focus point according to the moving distance to implement focusing.

However, an arrangement of the PD point pair in the electronic device is fixed. The electronic device may obtain a phase difference of an image in one direction by using the foregoing method, but phase differences may fail to be accurately obtained in other directions. In this case, the focusing accuracy of the electronic device is relatively low.

SUMMARY

According to a first aspect of the embodiments of the present application, an electronic device is provided, including at least two cameras, wherein each of the at least two cameras is provided with a PD point pair set, an angle value between directions of straight lines in which the PD point pair sets on every two cameras in the at least two cameras are located is within a first preset angle range.

According to a second aspect of the embodiments of the present application, a focusing method is provided, applied to an electronic device, the electronic device including at least two cameras, each of the at least two cameras being provided with a PD point pair set, the focusing method including: obtaining at least two target parameters, wherein each target parameter is a phase parameter obtained by using the PD point pair set on one camera, an angle value between directions of straight lines in which the PD point pair sets on every two cameras in the at least two cameras are located is within a first preset angle range; determining at least two target phase differences according to the at least two target parameters, wherein each target phase difference is a phase difference in a direction corresponding to one camera; and controlling the at least two cameras to focus according to the at least two target phase differences.

According to a third aspect of the embodiments of the present application, an electronic device is provided, including at least two cameras, each of the at least two cameras being provided with a PD point pair set, the electronic device including: an obtaining module, a determining module, and a control module. The obtaining module is configured to obtain at least two target parameters. Each target parameter is a phase parameter obtained by using the PD point pair set on one camera. An angle value between directions of straight lines in which the PD point pair sets on every two cameras in the at least two cameras are located is within a first preset angle range. The determining module is configured to determine at least two target phase differences according to the at least two target parameters obtained by the obtaining module. Each target phase difference is a phase difference in a direction corresponding to one camera. The control module is configured to control the at least two cameras to focus according to the at least two target phase differences determined by the determining module.

According to a fourth aspect of the embodiments of the present application, an electronic device is provided, including a processor, a memory, and a computer program stored in the memory and executable on the processor, wherein when the computer program is executed by the processor, steps of the focusing method according to the second aspect are implemented.

According to a fifth aspect of the embodiments of the present application, a non-transitory computer-readable storage medium is provided, storing a computer program, wherein when the computer program is executed by a processor, steps of focusing method according to the second aspect are implemented.

DETAILED DESCRIPTION

Figure 1:
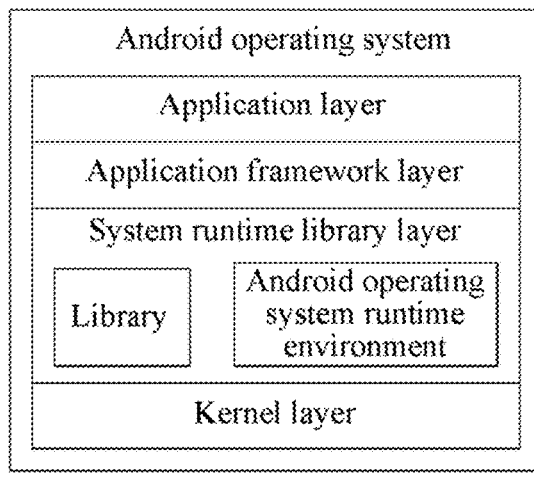
FIG. 1 is a schematic architectural diagram of an Android operating system according to an embodiment of the present application.

The following clearly describes the technical solutions in the embodiments of the present application with reference to the accompanying drawings in the embodiments of the present application. Apparently, the described embodiments are some of the embodiments of the present application rather than all of the embodiments. All other embodiments obtained by a person of ordinary skill in the art based on the embodiments of the present application shall fall within the protection scope of the present application.

The terms such as "first" and "second" in the specification and claims of the embodiments of the present application are used to distinguish different objects, but are not used to describe a specific sequence of objects. For example, a first camera, a second camera, and the like are intended to distinguish between different cameras, but are not intended to describe a particular order of the cameras.

In descriptions of the embodiments of the present application, "a plurality of" means two or more, unless otherwise stated. For example, a plurality of elements means two or more elements.

The term "and/or" used herein describes an association relationship for describing associated objects and represents that three relationships may exist. For example, a display panel and/or a backlight may represent the following three cases: Only the display panel exists, both the display and the backlight exist, and only the backlight exists. The symbol "/" in this specification indicates an "or" relationship between the associated objects. For example, input/output indicates input or output.

In the embodiments of the present application, the word such as "exemplary" or "example" is used to represent giving an example, an illustration, or a description. Any embodiment or design scheme described as an "exemplary" or "for example" in the embodiments of the present application should not be explained as being more preferred or having more advantages than another embodiment or design scheme. Exactly, use of the word "exemplary", "for example", or the like is intended to present a related concept in a specific manner.

The embodiments of the present application provide an electronic device and a focusing method. The electronic device may include at least two cameras. Each of the at least two cameras is provided with a PD point pair set. An angle value between directions of straight lines in which the PD point pair sets on every two cameras in the at least two cameras are located is within a first preset angle range. Because the angle value between the directions of straight lines in which the PD point pair sets on every two cameras are located is within the first preset angle range, the electronic device may obtain phase parameters in a plurality of different directions. Therefore, an in-focus position in a corresponding direction can be accurately determined, thereby improving the focusing accuracy of the electronic device.

The electronic device and the focusing method provided in the embodiments of the present application may be applied to a process of focusing a camera by the electronic device.

The electronic device in the embodiments of the present application may be an electronic device with an operating system. The operating system may be an Android operating system, an ios operating system, or another possible operating system, which is not specifically limited in the embodiments of the present application.

An Android operating system is used as an example below to describe a software environment to which the focusing method provided in the embodiments of the present application is applied.

FIG. 1 is a schematic architectural diagram of a possible Android operating system according to an embodiment of the present application. In FIG. 1, an architecture of the Android operating system includes four layers: an application layer, an application framework layer, a system runtime library layer, and a kernel layer (which may be specifically a Linux kernel layer).

The application layer includes various applications (including system applications and third-party applications) in the Android operating system.

The application framework layer is a framework for applications. A developer may develop some applications based on the application framework layer under a condition of obeying a development principle of the framework of the application.

The system runtime library layer includes a library (also referred to as a system library) and an Android operating system runtime environment. The library mainly provides various resources required by the Android operating system. The Android operating system runtime environment is used for providing the software environment for the Android operating system.

The kernel layer is an operating system layer of the Android operating system, and is the bottommost layer in Android operating system software layers. The kernel layer provides core system services and hardware-related drivers for the Android operating system based on a Linux kernel.

An Android operating system is used as an example. In the embodiments of the present application, a developer may develop a software program for implementing the focusing method provided in the embodiments of the present application based on a system architecture of the Android operating system shown in FIG. 1, so that the focusing method may be run based on the Android operating system shown in FIG. 1. That is, a processor or the electronic device may implement the focusing method provided in the embodiments of the present application by running the software program in the Android operating system.

The electronic device in the embodiments of the present application may be a mobile electronic device or a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a personal computer (PC), a television (TV), a teller machine, a self-service machine, or the like. This is not specifically limited in the embodiments of the present application.

The electronic device and the focusing method provided in the embodiments of the present application are described in detail below by using specific embodiments and application scenarios with reference to the accompanying drawings.

The embodiments of the present application provide an electronic device, including at least two cameras, each of the at least two cameras being provided with a PD point pair set.

In the embodiments of the present application, an angle value between directions of straight lines in which the PD point pair sets on every two cameras in the at least two cameras are located is within a first preset angle range.

In the embodiments of the present application, the PD point pair sets may include at least two PD point pairs.

It should be noted that the PD point pair may be understood as special pixels on a sensor of a camera for detecting a phase, and the special pixels generally appear in pairs. A PD sensor is a camera with a PD point pair.

Optionally, in the embodiments of the present application, the at least two cameras include a first camera and a second camera, the first camera is provided with a first PD point pair set, and the second camera is provided with a second PD point pair set. An angle value between a direction of a straight line in which the first PD point pair set is located and a direction of a straight line in which the second PD point pair set is located is within a second preset angle range.

It should be noted that the PD point pair set is described in detail in the following embodiments. Details are not described herein again.

The embodiments of the present application provide an electronic device. The electronic device may include at least two cameras. Each of the at least two cameras is provided with a PD point pair set. An angle value between directions of straight lines in which the PD point pair sets on every two cameras in the at least two cameras are located is within a first preset angle range. Because the angle value between the directions of straight lines in which the PD point pair sets on every two cameras are located is within the first preset angle range, the electronic device may obtain phase parameters in a plurality of different directions. Therefore, an in-focus position in a corresponding direction can be accurately determined, thereby improving the focusing accuracy of the electronic device.

Figure 2:
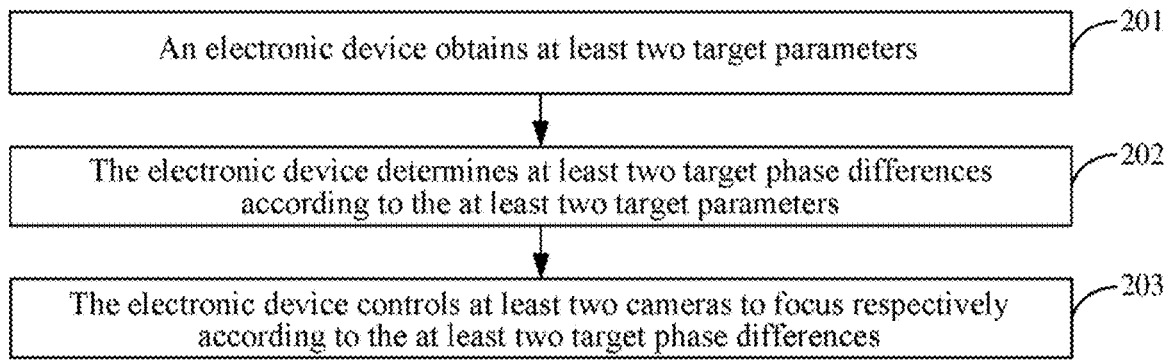
FIG. 2 is a first schematic diagram of a focusing method according to an embodiment of the present application.

The embodiments of the present application provide a focusing method. FIG. 2 is a flowchart of a focusing method according to an embodiment of the present application. The method may be applied to an electronic device having the Android operating system shown in FIG. 1. As shown in FIG. 2, the focusing method provided in the embodiments of the present application may include the following steps 201 to 203.

Step 201: The electronic device obtains at least two target parameters.

In the embodiments of the present application, the electronic device may include at least two cameras. Each of the at least two cameras is provided with a PD point pair set.

In the embodiments of the present application, each target parameter in the at least two target parameters is a phase parameter obtained by using the PD point pair set on one camera. An angle value between directions of straight lines in which the PD point pair sets on every two cameras in the at least two cameras are located is within a first preset angle range.

Optionally, in the embodiments of the present application, the at least two cameras may include a first camera and a second camera. The first camera is provided with a first PD point pair set. The second camera is provided with a second PD point pair set. An angle value between a direction of a straight line in which the first PD point pair set is located and a direction of a straight line in which the second PD point pair set is located is within a second preset angle range.

Optionally, in the embodiments of the present application, for a case that the electronic device includes N (N≥3) cameras, the angle value between the directions of straight lines in which the PD point pair sets on every two cameras are located may be 180° divided by N (for example, the first preset angle range).

Optionally, in the embodiments of the present application, each target parameter in the at least two target parameters includes a phase difference and a reliability value.

Optionally, in the embodiments of the present application, the at least two cameras include a first camera and a second camera. The at least two target parameters may include a first parameter and a second parameter.

Optionally, in the embodiments of the present application, the first parameter is a phase parameter when an image is acquired by using the first camera. The second parameter is a phase parameter when an image is acquired by using the second camera.

It may be understood that, in a case that a user triggers the electronic device to be in a shooting mode, the electronic device may obtain a phase parameter of a to-be-acquired image by using the first camera, and obtain a phase parameter of a to-be-acquired image by using the second camera.

Optionally, in the embodiments of the present application, the electronic device may obtain the first parameter by using the first PD point pair set, and obtain the second parameter by using the second PD point pair set.

It may be understood that a plurality of first PD point pairs (that is, the first PD point pair set) are provided on the first camera. The plurality of first PD point pairs are arranged in one direction. A plurality of second PD point pairs (that is, the second PD point pair set) are provided on the second camera. The plurality of second PD point pairs are arranged in one direction. An angle value between the two directions is within the second preset angle range.

It should be noted that, a relationship between the position of the first camera and the position of the second camera allows the angle value between the direction of a straight line in which the first PD point pair set is located and the direction of a straight line in which the second PD point pair set is located to be within the second preset angle range.

Optionally, in the embodiments of the present application, the second preset angle range may be a preset angle value, and the preset angle value is 90°.

Optionally, in the embodiments of the present application, an arrangement direction of the first PD point pair set is a first direction (for example, a horizontal direction). An arrangement direction of the second PD point pair set is a second direction (for example, a vertical direction). The first direction is perpendicular to the second direction.

Optionally, in the embodiments of the present application, the first parameter may include a first phase difference and a first reliability value corresponding to the first phase difference. The second parameter may include a second phase difference and a second reliability value corresponding to the second phase difference.

It may be understood that the first phase difference is an actually outputted phase difference of the first camera. The second phase difference is an actually outputted phase difference of the second camera. The first reliability value is an actually outputted reliability value of the first camera. The first reliability value is used for indicating the reliability of the first phase difference. The second reliability value is an actually outputted reliability value of the second camera. The second reliability value is used for indicating the reliability of the second phase difference.

In the embodiments of the present application, because the angle value between the directions of straight lines in which the PD point pair sets on every two cameras are located is within the first preset angle range, the electronic device may obtain phase parameters in a plurality of different directions. Therefore, an in-focus position in a corresponding direction is determined, thereby improving the accuracy of determining the in-focus position (or the focus position) by the electronic device.

In the embodiments of the present application, in a case that the angle value between the direction of a straight line in which the first PD point pair set is located and the direction of a straight line in which the second PD point pair set is located is within the second preset angle range, the electronic device may obtain phase parameters in two different directions. Therefore, an in-focus position in a corresponding direction is determined, thereby improving the accuracy of determining the in-focus position (or the focus position) by the electronic device.

Step 202: The electronic device determines at least two target phase differences according to the at least two target parameters.

In the embodiments of the present application, each target phase difference in the at least two target phase differences is a phase difference in a direction corresponding to one camera.

Figure 3:
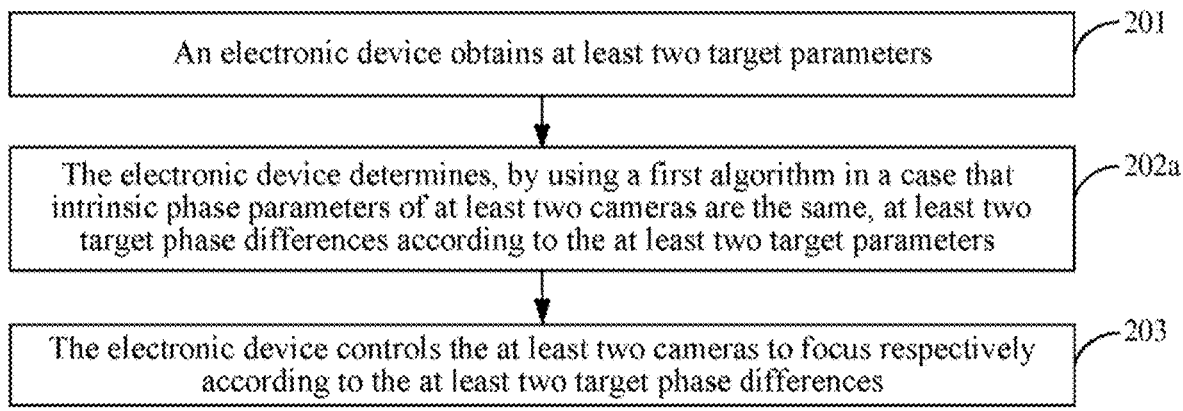
FIG. 3 is a second schematic diagram of a focusing method according to an embodiment of the present application.

Optionally, in the embodiments of the present application, with reference to FIG. 2 and as shown in FIG. 3, step 202 may be specifically implemented by using the following step 202a.

Step 202a: The electronic device determines, by using a first algorithm in a case that intrinsic phase parameters of the at least two cameras are the same, the at least two target phase differences according to the at least two target parameters.

Optionally, in the embodiments of the present application, each intrinsic phase parameter may include an intrinsic phase difference and an intrinsic reliability value.

It should be noted that, the intrinsic phase parameters of the at least two cameras being the same may be understood as that the intrinsic phase difference of each camera is within the same value range, and the intrinsic reliability value of each camera is within the same value range.

Optionally, in the embodiments of the present application, in a case that the at least two cameras include the first camera and the second camera, the electronic device may determine a target phase difference corresponding to the first camera and a target phase difference corresponding to the second camera according to the first parameter and the second parameter.

It may be understood that the electronic device may calculate, according to the first parameter and the second parameter, the phase difference in the direction corresponding to each camera by using the PD point pair.

It should be noted that, each target phase difference is a phase difference of the in-focus position corresponding to one camera.

Optionally, in the embodiments of the present application, in a case that a first intrinsic phase parameter of the first camera and a second intrinsic phase parameter of the second camera are the same, the electronic device may determine, by using the first algorithm, a target phase difference corresponding to the first camera and a target phase difference corresponding to the second camera according to the first parameter and the second parameter.

Optionally, in the embodiments of the present application, the first intrinsic phase parameter may include a first intrinsic phase difference and a first intrinsic reliability value. The second intrinsic phase parameter may include a second intrinsic phase difference and a second intrinsic reliability value.

It should be noted that, the first intrinsic phase parameter of the first camera and the second intrinsic phase parameter of the second camera being the same may be understood as that the first intrinsic phase difference and the second intrinsic phase difference are within the same value range, and the first intrinsic reliability value and the second intrinsic reliability value are within the same value range.

It may be understood that, in a case that the first intrinsic phase parameter and the second intrinsic phase parameter are the same, the phase difference in the direction corresponding to the first camera and the phase difference in the direction corresponding to the second camera that are calculated by the electronic device are the same.

Optionally, in the embodiments of the present application, the first algorithm may be $F_a=(F1 \times C1+F2 \times C2)/(C1+C2)$, where $F_a$ is the target phase difference, F1 is the first phase difference, C1 is the first reliability value, F2 is the second phase difference, and C2 is the second reliability value.

Figure 4:
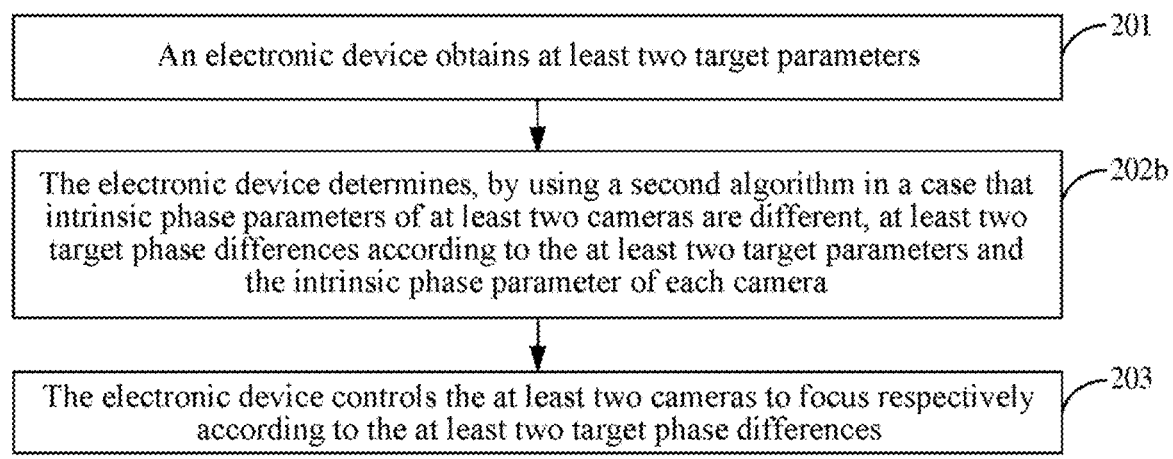
FIG. 4 is a third schematic diagram of a focusing method according to an embodiment of the present application.

Optionally, in the embodiments of the present application, with reference to FIG. 2 and as shown in FIG. 4, step 202 may be specifically implemented by using the following step 202b.

Step 202b: The electronic device determines, by using a second algorithm in a case that intrinsic phase parameters of the at least two cameras are different, the at least two target phase differences according to the at least two target parameters and the intrinsic phase parameter of each camera.

It should be noted that, the intrinsic phase parameters of the at least two cameras being different may be understood as that the intrinsic phase difference of each camera is within a different value range, and the intrinsic reliability value of each camera is within a different a value range.

Optionally, in the embodiments of the present application, in a case that the first intrinsic phase parameter of the first camera and the second intrinsic phase parameter of the second camera are different, the electronic device may determine, by using the second algorithm, the target phase difference according to the first intrinsic phase parameter, the second intrinsic phase parameter, the first parameter, and the second parameter.

It should be noted that, the first intrinsic phase parameter of the first camera and the second intrinsic phase parameter of the second camera being different may be understood as that the first intrinsic phase difference and the second intrinsic phase difference are within different value ranges, and the first intrinsic reliability value and the second intrinsic reliability value are within different value ranges.

Optionally, in the embodiments of the present application, the electronic device may map the first parameter to the second camera, or map the second parameter to the first camera, to calculate the phase difference corresponding to the first camera or the phase difference corresponding to the second camera.

Optionally, in the embodiments of the present application, it is assumed that the value range of the first intrinsic phase difference may be [F10, F11], the value range of the first intrinsic reliability value may be [C10, C11], the value range of the second intrinsic phase difference may be [F20, F21], and the value range of the second intrinsic reliability value may be [C20, C21].

For example, the first camera is used as an example for description. The first parameter may be mapped to the second camera. The second algorithm may be $F1''=F_b \times (F11-F10)/(F21-F20)$. F1" is the target phase difference corresponding to the first camera, and $F_b$ is the target phase difference corresponding to the second camera.

$F_b=(F1' \times C1'+F2 \times C2)/(C1'+C2)$, where F1' is a phase difference obtained by mapping the first phase difference to the second camera, C1' is a reliability value obtained by mapping the first reliability value to the second camera, F2 is the second phase difference, and C2 is the second reliability value.

$F1'=F1 \times (F21-F20)/(F11-F10)$, and $C1'=C1 \times (C21-C20)/(C11-C10)$, where F1 is the first phase difference, and C1 is the first reliability value.

Step 203: The electronic device controls the at least two cameras to focus according to the at least two target phase differences.

In the embodiments of the present application, the electronic device may first determine the in-focus position (that is, the focus position) of each camera in the at least two cameras according to the at least two target phase differences, and then separately control a corresponding camera according to each in-focus position to focus (that is, focus on a position in a to-be-shot image or in a preview interface).

Optionally, in the embodiments of the present application, the electronic device may calculate the in-focus position of the first camera or the in-focus position of the second camera according to the target phase difference $F_a$.

Optionally, in the embodiments of the present application, the electronic device may calculate the in-focus position of the first camera according to the target phase difference F1".

The electronic device may calculate the in-focus position of the second camera according to the target phase difference $F_b$.

Optionally, in the embodiments of the present application, the electronic device may calculate the phase difference by using the PD point pair, and then convert the phase difference into a moving distance of a motor to determine the in-focus position.

It should be noted that, in a case that the two cameras (that is, the first camera and the second camera) are arranged orthogonally (that is, the PD point pair on the first camera and the PD point pair on the second camera are arranged orthogonally), there is no possibility of a gradient direction (that is, a change direction of grayscale of an object) perpendicular to both the cameras. That is, there is always one camera with a relatively high reliability value, so that the phase difference in any gradient direction may be detected by using this solution.

In the embodiments of the present application, two cameras are used for focusing. As long as the arrangement directions of the PD point pairs of the two cameras are nearly completely orthogonal, the accuracy of a phase difference output may be improved, thereby improving a success rate of focusing without losing image quality.

The embodiments of the present application provide a focusing method. The electronic device may determine at least two target phase differences according to the obtained at least two target parameters (each target phase difference is a phase difference in a direction corresponding to one camera), and control the at least two cameras to focus according to the at least two target phase differences. Because the angle value between the directions of straight lines in which the PD point pair sets on every two cameras are located is within the first preset angle range, the electronic device may obtain phase parameters in a plurality of different directions. Therefore, an in-focus position in a corresponding direction can be accurately determined, thereby improving the focusing accuracy of the electronic device.

Figure 5:
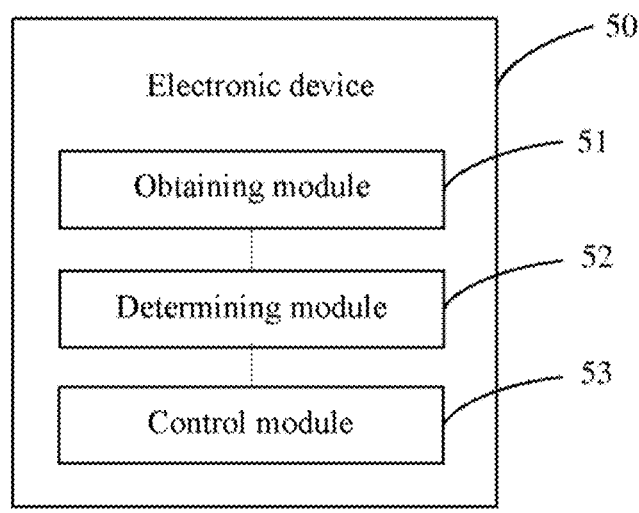
FIG. 5 is a schematic structural diagram of an electronic device according to an embodiment of the present application.

FIG. 5 is a possible schematic structural diagram of an electronic device related to the embodiments of the present application. The electronic device includes at least two cameras. Each of the at least two cameras is provided with a PD point pair set. As shown in FIG. 5, the electronic device 50 may include an obtaining module 51, a determining module 52, and a control module 53.

The obtaining module 51 is configured to obtain at least two target parameters. Each target parameter is a phase parameter obtained by using the PD point pair set on one camera. An angle value between directions of straight lines in which the PD point pair sets on every two cameras in the at least two cameras are located is within a first preset angle range. The determining module 52 is configured to determine at least two target phase differences according to the at least two target parameters obtained by the obtaining module 51. Each target phase difference is a phase difference in a direction corresponding to one camera. The control module 53 is configured to control the at least two cameras to focus according to the at least two target phase differences determined by the determining module 52.

In a possible implementation, the at least two cameras include a first camera and a second camera, the first camera is provided with a first PD point pair set, and the second camera is provided with a second PD point pair set. An angle value between a direction of a straight line in which the first PD point pair set is located and a direction of a straight line in which the second PD point pair set is located is within a second preset angle range. Each target parameter in the at least two target parameters includes a phase difference and a reliability value.

In a possible implementation, the determining module 52 is specifically configured to: determine, by using a first algorithm in a case that intrinsic phase parameters of the at least two cameras are the same, the at least two target phase differences according to the at least two target parameters; or determine, by using a second algorithm in a case that intrinsic phase parameters of the at least two cameras are different, the at least two target phase differences according to the at least two target parameters and the intrinsic phase parameter of each camera.

The electronic device provided in the embodiments of the present application can implement various processes implemented by the electronic device in the foregoing method embodiments. To avoid repetition, details are not described herein again.

The embodiments of the present application provide an electronic device. The electronic device may include at least two cameras. Each of the at least two cameras is provided with a PD point pair set. An angle value between directions of straight lines in which the PD point pair sets on every two cameras in the at least two cameras are located is within a first preset angle range. Because the angle value between the directions of straight lines in which the PD point pair sets on every two cameras are located is within the first preset angle range, the electronic device may obtain phase parameters in a plurality of different directions. Therefore, an in-focus position in a corresponding direction can be accurately determined, thereby improving the focusing accuracy of the electronic device.

Figure 6:
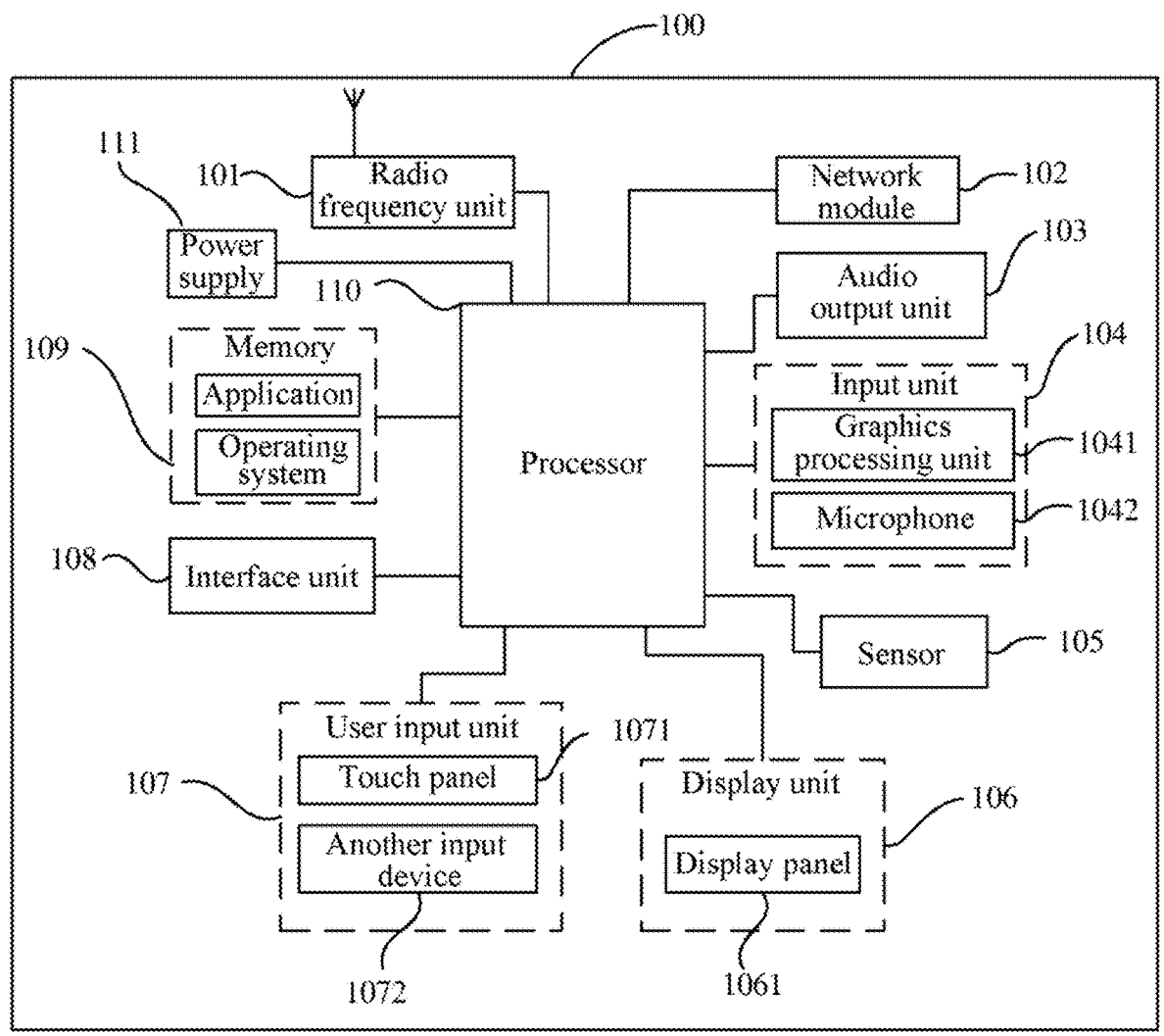
FIG. 6 is a schematic diagram of hardware of an electronic device according to an embodiment of the present application.

FIG. 6 is a schematic diagram of hardware of an electronic device according to the embodiments of the present application. As shown in FIG. 6, the electronic device 100 includes but is not limited to: a radio frequency unit 101, a network module 102, an audio output unit 103, an input unit 104, a sensor 105, a display unit 106, a user input unit 107, an interface unit 108, a memory 109, a processor 110, a power supply 111, and other components.

It needs to be noted that a person skilled in the art may understand that the structure of the electronic device shown in FIG. 6 constitutes no limitation on the electronic device, and the electronic device may include more or fewer components than those shown in FIG. 6, or some components may be combined, or a different component deployment may be used. In the embodiments of the present application, the electronic device includes, but is not limited to, a mobile phone, a tablet computer, a notebook computer, a palmtop computer, an in-vehicle terminal, a wearable device, a pedometer, and the like.

The processor 110 is configured to: obtain at least two target parameters, each target parameter being a phase parameter obtained by using the PD point pair set on one camera, an angle value between directions of straight lines in which the PD point pair sets on every two cameras in the at least two cameras are located being within a first preset angle range; determine at least two target phase differences according to the at least two target parameters, each target phase difference being a phase difference in a direction corresponding to one camera; and control the at least two cameras to focus according to the at least two target phase differences.

The embodiments of the present application provide an electronic device. The electronic device may determine at least two target phase differences according to the obtained at least two target parameters (each target phase difference is a phase difference in a direction corresponding to one camera), and control the at least two cameras to focus according to the at least two target phase differences. Because the angle value between the directions of straight lines in which the PD point pair sets on every two cameras are located is within the first preset angle range, the electronic device may obtain phase parameters in a plurality of different directions. Therefore, an in-focus position in a corresponding direction can be accurately determined, thereby improving the focusing accuracy of the electronic device.

It should be understood that in this embodiment of the present application, the radio frequency unit 101 may be configured to receive and transmit information or receive and transmit a signal during a call. For example, after DL data from a base station is received, the DL data is sent to the processor 110 for processing. In addition, UL data is sent to the base station. Generally, the radio frequency unit 101 includes, but is not limited to, an antenna, at least one amplifier, a transceiver, a coupler, a low noise amplifier, a duplexer, and the like. In addition, the radio frequency unit 101 may further communicate with another device through a wireless communications system and network.

The electronic device provides wireless broadband Internet access for a user by using the network module 102, for example, helps the user to send and receive an email, browse a webpage, and access stream media, and the like.

The audio output unit 103 may convert audio data received by the radio frequency unit 101 or the network module 102 or stored on the memory 109 into audio signals and output the audio signals as sounds. In addition, the audio output unit 103 may further provide an audio output that is related to a particular function executed by the electronic device 100 (for example, a call signal receiving sound or a message receiving sound). The audio output unit 103 includes a speaker, a buzzer, a receiver, and the like.

The input unit 104 is configured to receive an audio or video signal. The input unit 104 may include a graphics processing unit (GPU) 1041 and a microphone 1042. The graphics processing unit 1041 performs processing on image data of a static picture or a video that is obtained by an image acquisition device (for example, a camera) in a video acquisition mode or an image acquisition mode. The processed image frame can be displayed on the display unit 106. An image frame that has been processed by the graphics processing unit 1041 may be stored in the memory 109 (or another storage medium) or sent by using the radio frequency unit 101 or the network module 102. The microphone 1042 can receive sounds and can process such sounds as audio data. The processed audio data can be converted a phone call mode into an output in a format that can sent by the radio frequency unit 101 to a mobile communications base station.

The electronic device 100 further includes at least one sensor 105, such as an optical sensor, a motion sensor, and other sensors. For example, the optical sensor includes an ambient light sensor and a proximity sensor, where the ambient light sensor may adjust luminance of the display panel 1061 according to the luminance of the ambient light, and the proximity sensor may switch off the display panel 1061 and/or backlight when the electronic device 100 is moved to the ear. As one type of motion sensor, an acceleration sensor may detect magnitude of accelerations in various directions (which generally are triaxial), may detect magnitude and a direction of the gravity when static, and may be configured to identify an electronic device attitude (such as switchover between horizontal and vertical screens, a related game, and attitude calibration of a magnetometer), a related function of vibration identification (such as a pedometer and a knock); The sensor 105 may further include a fingerprint sensor, a pressure sensor, an iris sensor, a molecular sensor, a gyroscope, a barometer, a hygrometer, a thermometer, an infrared sensor, and the like, which are not described herein in detail.

The display unit 106 is configured to display information inputted by the user or information provided for the user. The display unit 106 may include a display panel 1061. The display panel 1061 may be configured in the form of a liquid crystal display (LCD), an organic light-emitting diode (OLED), or the like.

The user input unit 107 may be configured to receive input digit or character information, and generate key signal input related to the user setting and function control of the electronic device. For example, the user input unit 107 includes a touch panel 1071 and another input device 1072. The touch panel 1071, also referred to as a touchscreen, may collect a touch operation of a user on or near the touch panel (such as an operation of a user on or near the touch panel 1071 by using any suitable object or attachment, such as a finger or a stylus). The touch panel 1071 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and transmits the touch point coordinates to the processor 110. Moreover, the touch controller may receive and execute a command transmitted from the processor 110. In addition, the touch panel 1071 may be implemented by using various types, such as a resistive type, a capacitive type, an infrared type, and a surface acoustic wave type. In addition to the touch panel 1071, the user input unit 107 may further include the another input device 1072. For example, the another input device 1072 may include, but not limited to, a physical keyboard, a functional key (such as a volume control key or a switch key), a track ball, a mouse, and a joystick, which are not described herein in detail.

Optionally, the touch panel 1071 may cover the display panel 1061. After detecting a touch operation on or near the touch panel, the touch panel 1071 transfers the touch operation to the processor 110, to determine a type of a touch event. Then, the processor 110 provides a corresponding visual output on the display panel 1061 according to the type of the touch event. In FIG. 6, the touch panel 1071 and the display panel 1061 implement, as two independent parts, input and output functions of the electronic device. However, in some embodiments, the touch panel 1071 and the display panel 1061 may be integrated to implement the input and output functions of the electronic device, which is not specifically limited herein.

The interface unit 108 is an interface for connecting an external apparatus to the electronic device 100. For example, the interface unit 1708 may include a wired or wireless headset port, an external power supply (or battery charger) port, a wired or wireless data port, a memory card port, a port for connecting an apparatus with a recognition module, an audio input/output (I/O) port, a video I/O port, a headphone port, and the like. The interface unit 108 may be configured to receive an input (such as data information or electric power) from an external apparatus and transmit the received input to one or more elements in the electronic device 100 or may be configured to transmit data between the electronic device 100 and an external apparatus.

The memory 109 may be configured to store a software program and various data. The memory 109 may mainly include a program storage area and a data storage area. The program storage area may store an operating system, an application program required by at least one function (for example, a sound playback function and an image display function), and the like. The data storage area may store data (for example, audio data and an address book) created according to the use of the mobile phone, and the like. In addition, the memory 109 may include a high speed random access memory, and may further include a non-volatile memory, such as at least one magnetic disk storage device, a flash memory or another volatile solid-state storage device.

A processor 110 is the control center of the electronic device, and is connected to various parts of the electronic device by using various interfaces and lines. By running or executing the software program and/or module stored in the memory 109, and invoking data stored in the memory 109, the processor 610 performs various functions and data processing of the electronic device, thereby performing overall monitoring on the electronic device. The processor 110 may include one or more processing units, and optionally, the processor 110 may integrate an application processor and a modem processor. The application processor mainly processes an operating system, a user interface, an application program, and the like. The modem processor mainly processes wireless communication. It may be understood that the foregoing modem processor may not be integrated into the processor 110.

The electronic device 100 further includes the power supply 111 (such as a battery) for supplying power to the components. Optionally, the power supply 111 may be logically connected to the processor 110 by using a power management system, thereby implementing functions such as charging, discharging, and power consumption management by using the power management system.

In addition, the electronic device 100 includes some functional module that are not shown, which are not described herein in detail.

Optionally, the embodiments of the present application further provide an electronic device, including a processor 110 a memory 109 that are shown in FIG. 6 and a computer program on the memory 109 and executed on the processor 110, where when executed by the processor 110, the computer program implements the processes of the embodiment of the method, and can achieve the same technical effects. To avoid repetition, details are not described herein again.

An embodiment of the present application further provides a non-transitory computer-readable storage medium, storing a computer program, where the computer program, when executed by a processor, implements each process of the foregoing embodiments of the method, and the same technical effect can be achieved. To avoid repetition, details are not repeated herein. The non-transitory computer-readable storage medium may include a flash drive, a read-only memory (ROM), a random access memory (RAM), a magnetic disk, or an optical disc.

It should be noted that the terms "include", "comprise", or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one" does not exclude that there are still other same elements in the processes, methods, objects, or apparatuses.

Through the descriptions of the foregoing implementations, a person skilled in the art may clearly understand that the methods in the foregoing embodiments may be implemented by means of software and a necessary general hardware platform, and certainly, may also be implemented by hardware, but in many cases, the former manner is a better implementation. Based on such understanding, the technical solutions of the present application or a part thereof that makes a contribution to the prior art may be essentially embodied in a form of a software product. The computer software product is stored in a storage medium (such as a ROM/RAM, a disk, and an optical disk), including several instructions to enable one electronic device (which may be a mobile phone, a computer, a server, an air conditioner a network device, or the like) to perform the methods in the embodiments of the present application.

The embodiments of the present application are described above with reference to the accompanying drawings. However, the present application is not limited to the foregoing specific implementations. The foregoing specific implementations are illustrative instead of limitative. Enlightened by the present application, a person of ordinary skill in the art can make many forms without departing from the idea of the present application and the scope of protection of the claims. All of the forms fall within the protection of the present application.

What is claimed is:

1. An electronic device, comprising at least two cameras, wherein each of the at least two cameras is provided with a phase difference (PD) point pair set, the PD point pair set is used to detect a phase; and
   an angle value between directions of straight lines in which PD point pair sets on every two cameras in the at least two cameras are located is within a first preset angle range.

2. The electronic device according to claim 1, wherein the at least two cameras comprise a first camera and a second camera, the first camera is provided with a first PD point pair set, and the second camera is provided with a second PD point pair set; and
   an angle value between a direction of a straight line in which the first PD point pair set is located and a direction of a straight line in which the second PD point pair set is located is within a second preset angle range.

3. A focusing method for an electronic device, the electronic device comprising at least two cameras, each of the at least two cameras being provided with a phase difference (PD) point pair set, the method comprising:
   obtaining at least two target parameters, wherein each target parameter is a phase parameter obtained by using the PD point pair set on one camera, an angle value between directions of straight lines in which the PD point pair sets on every two cameras in the at least two cameras are located is within a first preset angle range, and the PD point pair set is used to detect a phase;
   determining at least two target phase differences according to the at least two target parameters, wherein each target phase difference is a phase difference in a direction corresponding to one camera; and
   controlling the at least two cameras to focus according to the at least two target phase differences.

4. The method according to claim 3, wherein the at least two cameras comprise a first camera and a second camera, the first camera is provided with a first PD point pair set, and the second camera is provided with a second PD point pair set; an angle value between a direction of a straight line in which the first PD point pair set is located and a direction of a straight line in which the second PD point pair set is located is within a second preset angle range; and each target parameter in the at least two target parameters comprises a phase difference and a reliability value.

5. The method according to claim 3, wherein the determining at least two target phase differences according to the at least two target parameters comprises:

determining, by using a first algorithm in a case that intrinsic phase parameters of the at least two cameras are the same, the at least two target phase differences according to the at least two target parameters; or determining, by using a second algorithm in a case that intrinsic phase parameters of the at least two cameras are different, the at least two target phase differences according to the at least two target parameters and the intrinsic phase parameter of each camera.

6. An electronic device, comprising a processor, a memory, and a computer program stored in the memory and executable on the processor, wherein the computer program, when executed by the processor, causes the electronic device to perform:

obtaining at least two target parameters, wherein each target parameter is a phase parameter obtained by using a phase difference (PD) point pair set on one camera, an angle value between directions of straight lines in which the PD point pair sets on every two cameras in the at least two cameras are located is within a first preset angle range, and the PD point pair set is used to detect a phase;

determining at least two target phase differences according to the at least two target parameters, wherein each target phase difference is a phase difference in a direction corresponding to one camera; and controlling the at least two cameras to focus according to the at least two target phase differences.

7. The electronic device according to claim 6, wherein the at least two cameras comprise a first camera and a second camera, the first camera is provided with a first PD point pair set, and the second camera is provided with a second PD point pair set; an angle value between a direction of a straight line in which the first PD point pair set is located and a direction of a straight line in which the second PD point pair set is located is within a second preset angle range; and each target parameter in the at least two target parameters comprises a phase difference and a reliability value.

8. The electronic device according to claim 6, wherein the computer program, when executed by the processor, causes the electronic device to perform:

determining, by using a first algorithm in a case that intrinsic phase parameters of the at least two cameras are the same, the at least two target phase differences according to the at least two target parameters; or determining, by using a second algorithm in a case that intrinsic phase parameters of the at least two cameras are different, the at least two target phase differences according to the at least two target parameters and the intrinsic phase parameter of each camera.

9. A non-transitory computer-readable storage medium, storing a computer program, wherein when the computer program is executed by a processor, steps of the focusing method according to claim 3 are implemented.

10. A non-transitory computer-readable storage medium, storing a computer program, wherein when the computer program is executed by a processor, steps of the focusing method according to claim 4 are implemented.

11. A non-transitory computer-readable storage medium, storing a computer program, wherein when the computer program is executed by a processor, steps of the focusing method according to claim 5 are implemented.

* * * * *